US012689028B2

(12) United States Patent
Huang et al.

(10) Patent No.: US 12,689,028 B2
(45) Date of Patent: Jul. 21, 2026

(54) POSITIVE ELECTRODE PLATE, SECONDARY BATTERY, BATTERY MODULE, BATTERY PACK, AND POWER CONSUMING DEVICE

(71) Applicant: CONTEMPORARY AMPEREX TECHNOLOGY (HONG KONG) LIMITED, Hong Kong (CN)

(72) Inventors: Jichun Huang, Ningde City (CN); Yanying Wu, Ningde City (CN); Xinghui Wang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 576 days.

(21) Appl. No.: 18/314,828

(22) Filed: May 10, 2023

(65) Prior Publication Data

US 2023/0307616 A1 Sep. 28, 2023

Related U.S. Application Data

(63) Continuation of application No. PCT/CN2022/072320, filed on Jan. 17, 2022.

(51) Int. Cl.
H01M 4/36 (2006.01)
H01M 4/131 (2010.01)
(Continued)

(52) U.S. Cl.
CPC ........... H01M 4/366 (2013.01); H01M 4/131 (2013.01); H01M 4/5825 (2013.01);
(Continued)

(58) Field of Classification Search
CPC ....... H01M 4/366; H01M 4/021; H01M 4/028
See application file for complete search history.

(56) References Cited

U.S. PATENT DOCUMENTS 9,172,087 B2 10/2015 Ooishi et al.
2013/0011331 A1* 1/2013 Nagai .................... C01G 53/82
423/594.15
(Continued)

FOREIGN PATENT DOCUMENTS

CN 102612772 A 7/2012
CN 109560249 A 4/2019
(Continued)

OTHER PUBLICATIONS

International Search Report received in the corresponding International Application PCT/CN2022/072320, mailed Oct. 11, 2022.
(Continued)

*Primary Examiner* — Kaj K Olsen
(74) *Attorney, Agent, or Firm* — K&L Gates LLP

(57) ABSTRACT

A positive electrode plate, a secondary battery comprising the positive electrode plate, as well as a battery module, a battery pack, and a power consuming device are provided. The positive electrode plate of the present invention comprises: a positive current collector and a positive film layer comprising a first positive film layer and a second positive film layer, wherein the first positive film layer is disposed on at least one surface of the positive current collector and comprises a first positive active material comprising a hollow particle material, and the second positive film layer is disposed on the first positive film layer and comprises a second positive active material comprising a solid particle material.

19 Claims, 4 Drawing Sheets

(51) Int. Cl.
    *H01M 4/58*         (2010.01)
    *H01M 4/02*         (2006.01)
    *H01M 10/0525*     (2010.01)

(52) U.S. Cl.
    CPC ............................ *H01M 2004/021* (2013.01);
        *H01M 2004/028* (2013.01); *H01M 10/0525*
        (2013.01); *H01M 2220/20* (2013.01)

(56)         References Cited

U.S. PATENT DOCUMENTS

| | | | | |
|---|---|---|---|---|
| 2014/0087263 A1* | 3/2014 | Matsumoto | ........... | H01M 4/525 |
| | | | | 429/223 |
| 2014/0205901 A1* | 7/2014 | Nagai | ................... | H01M 4/131 |
| | | | | 427/126.6 |
| 2019/0372090 A1* | 12/2019 | Sugiura | ................ | H01M 4/624 |
| 2020/0194781 A1 | 6/2020 | Tabushi et al. | | |

FOREIGN PATENT DOCUMENTS

| | | | |
|---|---|---|---|
| CN | 109982973 A | 7/2019 |
| CN | 111312988 A | 6/2020 |
| CN | 112151793 A | 12/2020 |
| CN | 113285062 A | 8/2021 |
| JP | 2014143063 A | 8/2014 |
| JP | 2017157529 A | 9/2017 |
| JP | 2021120937 A | 8/2021 |

OTHER PUBLICATIONS

The extended European search report received in the counterpart European application 22879653.8, mailed on Nov. 27, 2024.
Office Action (with English Machine Translation), mailed Sep. 23, 2025, for corresponding Chinese Patent Application Serial No. 202280020064.0.

\* cited by examiner

5

5

POSITIVE ELECTRODE PLATE, SECONDARY BATTERY, BATTERY MODULE, BATTERY PACK, AND POWER CONSUMING DEVICE

CROSS REFERENCE TO RELATED APPLICATIONS

The present application is a continuation of International Application PCT/CN2022/072320, filed Jan. 17, 2022 and entitled "POSITIVE ELECTRODE PLATE, SECONDARY BATTERY, BATTERY MODULE, BATTERY PACK, AND POWER CONSUMING DEVICE", the entire disclosure of which is incorporated herein by reference.

TECHNICAL FIELD

The present invention relates to the field of batteries, and in particular, to a positive electrode plate, a secondary battery comprising the positive electrode plate, a battery module, a battery pack, and a power consuming device.

BACKGROUND ART

Lithium ion batteries (LIBs) are widely used in consumer electronics, electric vehicles and energy storage applications because of their long cycle life, wide operating temperature range, and high energy and power density. In order to meet the needs of electric vehicle customers for longer single charge mileage, there is a need to improve the energy density of electric vehicle batteries.

As a method for improving the energy density, in the prior art, the area load of an active material is increased by using a thick electrode, thereby reducing the weight proportion of an inactive material (current collector, separator, electrolyte, etc.). However, simply increasing the electrode thickness will increase the transmission distance of ions and electrons, resulting in severe polarization and poor electrochemical performance. In particular, when the current density is high, the active substance in a layer close to the current collector is reacted incompletely, and the active substance at a side close to the separator is over-reacted, so that excessive lithium deintercalation leads to collapse of a layered structure (micromorphology is manifested as particle breakage), and the electrical performance gets seriously deteriorated.

The existing methods for preparation of a thick electrode are generally characterized by immature process, high costs, and at the expense of other properties, making them difficult to achieve the desired effects. Therefore, how to increase the electrode thickness without sacrificing the electrochemical performance of a battery cell is the focus of current research on thick electrodes.

SUMMARY OF THE INVENTION

The present application is made in view of the above-mentioned technical problems, and an object of the present application is to provide a positive electrode plate, a secondary battery comprising the positive electrode plate, as well as a battery module, a battery pack, and a power consuming device. The positive electrode plate of the present application can contribute to reducing the diffusion path of lithium ions ($Li^+$) in the active material and improving the dynamics performance of the secondary battery; increasing the specific surface area (BET) of the active material, thereby increasing the reaction area of the active material;

and can increase the compacted density of the positive electrode plate and effectively increase the energy density of the battery cell.

In order to achieve the above object, in a first aspect, the present application provides a positive electrode plate, wherein the positive electrode plate comprises: a positive current collector and a positive film layer comprising a first positive film layer and a second positive film layer, wherein, the first positive film layer is disposed on at least one surface of the positive current collector and comprises a first positive active material comprising a hollow particle material; and the second positive film layer is disposed on the first positive film layer and comprises a second positive active material comprising a solid particle material.

The positive film layer is formed by coating two layers of positive electrode materials with different particle morphologies: a first layer is a first positive film layer disposed on the current collector, is a bottom layer close to the current collector, and is a coating layer having hollow particles formed of a hollow particle material; and a second layer is a second positive film layer disposed on the first positive film layer, is a top layer close to a separator, and is a coating layer having a solid structure formed of a solid particle material.

The advantages of the double-layer structure are as follows. The first layer is disposed close to the current collector, and its hollow structure facilitates to reduce the diffusion path of $Li^+$ in the active material, and since the solid particle material generally has a BET not exceeding 1 $m^2/g$, the hollow structure can increase the BET of the material to be above 2 $m^2/g$, greatly increasing the reaction area of the active material. The second layer is disposed close to the separator and anode, so the migration path of $Li^+$ is short, and the solid structure of the second layer can increase the battery cell capacity and the compacted density, and effectively improve the energy density of a battery cell.

In some embodiments, in the hollow particle material, the number of hollow particles accounts for 70% or more of the number of all particles of the first positive active material. If the number of the hollow particles is less than 70% of the number of all the particles of the first positive active material, the rate performance will be reduced. Therefore, the rate performance can be improved by making the proportion of the hollow particles in the particles of the first positive active material in the range of 70% or more as described above.

In some embodiments, the hollow particles have a volume median particle size of 1-15 μm, and optionally 3-9 μm; and/or the solid particles have a volume median particle size of 1-15 μm, and optionally 3-9 μm. If the volume median particle size of the hollow particles exceeds 15 μm, the rate performance is degraded; and if the volume median particle size is lower than 1 μm, material synthesis is difficult, and the compacted density is low, which is disadvantageous to the improvement of the energy density. Therefore, by making the volume median particle size of the hollow particles within the range of 1-15 μm, the energy density and the rate performance are both taken into account, and further, from the viewpoint of combining various performances, the volume median particle size of the hollow particles is preferably between 3-9 μm. Moreover, the volume median particle size of the hollow particles in the first positive active material particles is preferably comparable to, and further preferably equal to, the volume median particle size of the solid particles in the second positive active material particles, whereby the rate performance of the battery cell can be effectively improved, and the compacted density of the plate is high, thereby facilitating the improvement of the energy density of the battery cell.

In some embodiments, a ratio of the volume median particle size of the hollow particles to the volume median particle size of the solid particles (i.e., the volume median particle size of the hollow particles/the volume median particle size of the solid particles) is between 0.5-2. If the ratio of the volume median particle size of the hollow particles to the volume median particle size of the solid particles exceeds 2, the compacted density of the plate will be low, and thus the energy density will be low, and if the ratio is lower than 0.5, the dynamics will be poor. Therefore, by making the ratio of the volume median particle size of the hollow particles to the volume median particle size of the solid particles in the range of 0.5-2, better dynamics and a higher energy density can be obtained.

In some embodiments, a ratio of the hollow diameter of the hollow particles to the volume median particle size of the hollow particles (i.e., the hollow diameter of the hollow particles/the volume median particle size of the hollow particles) is between 0.1-0.5. If the ratio of the hollow diameter of the hollow particles to the volume median particle size of the hollow particles exceeds 0.5, the compacted density of the plate will be low, and the particles are easily crushed at a high compacted density. If the ratio is lower than 0.1, the rate performance will be reduced. Therefore, by making the ratio of the hollow diameter of the hollow particles to the volume median particle size of the hollow particles in the range of 0.1-0.5, the compacted density and the rate performance can be both taken into account.

In some embodiments, the hollow particle material has a BET of 1-3 $m^2/g$ and the solid particle material has a BET of 0.1-1 $m^2/g$.

In some embodiments, a weight ratio of the first positive film layer to the second positive film layer (i.e., weight of the first positive film layer/weight of the second positive film layer) is between 1:9-9:1. If the weight ratio of the first positive film layer to the second positive film layer exceeds 9:1, the compacted density of the plate will be low, and if the weight ratio is lower than 1:9, the rate performance will be reduced. Therefore, by making the weight ratio of the first positive film layer to the second positive film layer in the range between 1: 9-9:1, the compacted density and the rate performance can be both taken into account.

In some embodiments, the first positive film layer has a thickness of 100-200 μm; and/or the second positive film layer has a thickness of 100-200 μm.

In some embodiments, a thickness ratio of the first positive film layer to the second positive film layer (i.e., thickness of the first positive film layer/thickness of the second positive film layer) is between 0.5-2. If the ratio of the thickness of the first positive film layer to the thickness of the second positive film layer exceeds 2, the compacted density of the plate will be low, and therefore the energy density is low. If the ratio is lower than 0.5, the rate performance will be reduced. Therefore, by making the ratio of the thickness of the first positive film layer to the thickness of the second positive film layer in the range of 0.5-2, the compacted density and the rate performance can be both taken into account.

A second aspect of the present application provides a secondary battery comprising the electrode plate according to the first aspect of the present application.

A third aspect of the present application provides a battery module comprising the secondary battery according to the second aspect of the present application.

A fourth aspect of the present application provides a battery pack comprising the battery module according to the third aspect of the present application.

A fifth aspect of the present application provides a power consuming device comprising at least one of the secondary battery according to the second aspect of the present application, the battery module according to the third aspect of the present application, and the battery pack according to the forth aspect of the present application.

The positive electrode plate according to the present invention can contribute to reducing the diffusion path of $Li^+$ in the active material and improving the dynamics performance of the secondary battery; increasing the BET of the active material, thereby increasing the reaction area of the active material; and can increase the compacted density of the positive electrode plate and effectively increase the energy density of the battery cell.

BRIEF DESCRIPTION OF THE DRAWINGS

FIG. 1b is a partially enlarged view of a hollow particle material contained in a first positive film layer of FIG. 1a.

FIG. 2b is a partially enlarged view of a hollow particle material contained in a first positive film layer of FIG. 2a.

Figure 1A:
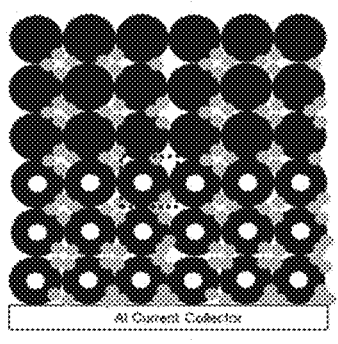
FIG. 1a is a structural schematic diagram of a positive electrode plate according to an embodiment of the present application.

LIST OF REFERENCE SIGNS 1 battery pack; 2 upper case; 3 lower case; 4 battery module; 5 secondary battery; 51 housing; 52 electrode assembly; 53 top cover assembly

DETAILED DESCRIPTION OF EMBODIMENTS

Hereinafter, embodiments of a positive electrode plate, a secondary battery, a battery module, a battery pack and an electrical device of the present application are specifically disclosed in the detailed description with reference to the accompanying drawings as appropriate. However, unnecessary detailed illustrations may be omitted in some instances. For example, there are situations where detailed description of well-known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined thus may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values of 1 and 2 are listed, and maximum range values of 3, 4, and 5 are listed, the following ranges are all contemplated: 1-3, 1-4, 1-5, 2-3, 2-4 and 2-5. In the present application, unless stated otherwise, the numerical range "a-b" denotes an abbreviated representation of any combination of real numbers between a and b, where both a and b are real numbers. For example, the numerical range "0-5" means that all real numbers between "0 and 5" have been listed in the text, and "0-5" is just an abbreviated representation of combinations of these numerical values. In addition, when a parameter is expressed as an integer of $\geq 2$, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

The terms "comprise" and "include" mentioned in the present application are open-ended or closed-ended, unless otherwise stated. For example, the terms "comprise" and "include" may mean that other components not listed may also be comprised or included, or only the listed components may be comprised or included.

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

Positive Electrode Plate

In an embodiment of the present application, a positive electrode plate is provided. The positive electrode plate comprises: a positive current collector and a positive film layer comprising a first positive film layer and a second positive film layer, wherein the first positive film layer is disposed on at least one surface of the positive current collector and comprises a first positive active material comprising a hollow particle material; and the second positive film layer is disposed on the first positive film layer and comprises a second positive active material comprising a solid particle material.

As an example, the positive current collector has two surfaces opposite one another in its own thickness direction, the first positive film layer is disposed on either or both of the two opposite surfaces of the positive current collector, and further, the second positive film layer is disposed on the first positive film layer.

In some embodiments, the positive current collector can be a metal foil or a composite current collector. For example, as a metal foil, an aluminum foil can be used. The composite current collector may include a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the first positive film layer comprises a first positive active material, the second positive film layer comprises a second positive active material, and the first positive active material and the second positive active material positive active material are two positive active materials with different particle morphologies for batteries.

As an example, the first positive active material may include at least one of the following materials: a hollow particle material composed of a lithium-containing phosphate having an olivine structure, a hollow particle material composed of a lithium transition metal oxide, and a hollow particle material composed of a modified compound of a lithium-containing phosphate having an olivine structure or a modified compound of a lithium transition metal oxide. The second positive active material may include at least one of the following materials: a solid particle material composed of a lithium-containing phosphate having an olivine structure, a solid particle material composed of a lithium transition metal oxide, and a solid particle material composed of a modified compound of a lithium-containing phosphate having an olivine structure or a modified compound of a lithium transition metal oxide.

However, the first positive active material and the second positive active material of the present application are not limited to those materials, and other conventional materials which can be used as a positive active material for batteries may be used as long as the first positive active material has hollow particles and the second positive active material has solid particles. These positive active materials may be used alone or in combination of two or more. Among them, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$ (also referred to as NCM333), $LiNi_{0.5}CO_{0.2}Mn_{0.3}O_2$ (also referred to as NCM523), $LiNi_{0.5}Co_{0.25}Mn_{0.25}O_2$ (also referred to as NCM211), $LiNi_{0.6}Co_{0.2}Mn_{0.2}O_2$ (also referred to as NCM622), $LiNi_{0.8}Co_{0.1}Mn_{0.1}O_2$ (also referred to as NCM811), lithium nickel cobalt aluminum oxide (e.g. $LiNi_{0.85}Co_{0.15}Al_{0.05}O_2$), and modified compounds thereof, etc. Examples of lithium-containing phosphates having olivine structures may include, but are not limited to, at least one of lithium iron phosphate (e.g. $LiFePO_4$ (also referred to as LFP)), lithium iron phosphate and carbon composites, lithium manganese phosphate (e.g. LiMnPO4), lithium manganese phosphate and carbon composites, lithium iron manganese phosphate, and lithium iron manganese phosphate and carbon composites.

As a schematic structural diagram of a positive electrode plate in an embodiment of the present application, referring to FIG. 1a, the positive electrode plate includes a double-layer positive film layer having different particle morphologies, wherein a first positive film layer with a hollow particle structure is disposed on the positive current collector; and a second positive film layer with a solid particle structure is disposed on the first positive film layer.

When the above conditions are satisfied, it is advantageous to reduce the diffusion path of Li+ in the active material, and to well exert the energy of the active material in a thick electrode, which has the advantage of high energy density and better rate performance.

As shown in FIG. 1a, in the first positive active material, the number of hollow particles accounts for 70% or more of the number of all particles of the first positive active material from the viewpoint of reducing the diffusion path of lithium ions in the first positive film layer close to the current collector.

In the present application, a size of the particles is collectively referred to as a particle size. Generally, the particle size of spherical particles is represented by diameter; the particle size of cubic particles is represented by side length; and for irregular particles, a diameter of a sphere with the same behavior as the particle can be used as the equivalent diameter of the particle. The magnitude of the particle size is usually represented by indices such as median particle size (D50), specific surface area (BET), and the like.

Specifically, a median particle size (D50) is a diameter (particle size value) of one particle in a selected sample. If the number of particles with a diameter greater than the diameter accounts for 50%, and the number of particles with a diameter smaller than the particle size value accounts for 50%, the diameter is called as median particle size (D50). The median particle size (D50) is used to denote the average particle size of the particles of the present application.

Further, a specific surface area (BET) is the sum of the surface areas of the particles per unit mass. The specific surface area of the particles is related to the particle size, and the smaller the particle size is, the larger the specific surface area will be.

Figure 1B:
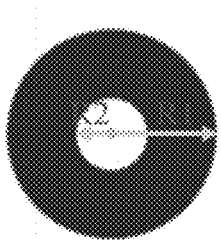

Referring to FIG. 1b, hollow particles of the first positive film layer is described in detail as an example. It is assumed that each of the hollow particles has a radius $R_1$, its hollow portion has a radius $R_2$, the hollow particle is a spherical particle, and the surface area and volume of the hollow particle are calculated according to a sphere.

The diameter of the hollow particle is calculated according to the formula $D=2R_1$.

The median particle size (D50) of the hollow particles is a diameter (particle size value) of one of the particles in the selected sample. If the number of the hollow particles with a diameter greater than the diameter accounts for 50%, and the number of particles with a diameter smaller than the particle size value accounts for 50%, the diameter is called as median particle size (D50). The median particle size (D50) of the hollow particles is used to denote the average particle size of the hollow particles of the present application. The first positive active material of the present application is mainly composed of hollow spherical particles, in which the hollow particles have a volume median particle size of 1-15 μm, and preferably 3-9 μm, from the viewpoint of reducing the diffusion path of lithium ions in the first positive film layer close to the current collector.

As shown in FIG. 1b, a ratio of a hollow diameter of the hollow particles to the volume median particle size of the hollow particles is calculated as $R_2/R_1$, and the ratio is between 0.1-0.5 from the viewpoint of reducing the diffusion path of lithium ions in the first positive film layer close to the current collector and ensuring the reaction area of the reactive material.

In addition, the second positive active material of the present application is mainly composed of solid spherical particles, in which the solid particles have a volume median particle size of 1-15 μm, and preferably 3-9 μm, from the viewpoint of increasing the compacted density of the plate and increasing the battery cell capacity.

Further, a ratio of the volume median particle size of the hollow particles to the volume median particle size of the solid particles is between 0.5-2 from the viewpoint of taking into account the diffusion path of lithium ions, the battery cell capacity and the compacted density, and the volume median particle size of the hollow particles and the volume median particle size of the solid particles are preferably the same, that is the ratio of the volume median particle size of the hollow particles to the volume median particle size of the solid particles is 1, from the viewpoint of increasing the rate performance of the battery cell, increasing the compacted density, and increasing the energy density of the battery cell.

The hollow particle material of the first positive active material of the present application has a BET of 1-3 $m^2/g$ from the viewpoint of increasing the reaction area of the active material; and the solid particle material of the second positive active material has a BET of 0.1-1 $m^2/g$.

Further, the first positive film layer and the second positive film layer of the present application are synchronously formed by a coating apparatus, and a weight ratio of the first positive film layer to the second positive film layer is between 1:9 and 9:1. Also, from the viewpoint of taking into account the compacted density and the energy density, the weight of the first positive film layer and the weight of the second positive film layer are preferably the same, that is, the weight ratio of the first positive film layer to the second positive film layer is 1:1.

From the viewpoint of taking into account both energy density and dynamics, the first positive film layer has a thickness of 100-200 μm; and/or the second positive film layer has a thickness of 100-200 μm. A thickness ratio of the first positive film layer to the second positive film layer is between 0.5-2. Also, the feedback from the test results shows that it is preferred that the first positive film layer has the same thickness as the second positive film layer, that is, the thickness ratio of the first positive film layer to the second positive film layer is preferably 1.

In some embodiments, the first positive film layer and the second positive film layer may optionally comprise a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the first positive film layer and the second positive film layer further optionally comprises a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: dispersing the above-described components for preparing the positive electrode plate, such as a first positive active material, a conductive agent, a binder and any other components, in a solvent (e.g., N-methylpyrrolidone) to form a first positive electrode slurry; and dispersing a second positive electrode slurry, a conductive agent, a binder and any other components in a solvent (such as N-methylpyrrolidone) to form a second positive electrode slurry; and coating the positive current collector with the first positive electrode slurry, and coating the second positive electrode slurry on the first positive electrode slurry simultaneously (the two coating procedures are performed synchronously and completed synchronously), followed by the procedures such as drying, cold pressing, slitting, and die cutting, so as to obtain the positive electrode plate.

Secondary Battery

In one embodiment of the present application, a secondary battery is provided.

The secondary battery of the present application comprises: the positive electrode plate of the first aspect of the present application as described above, as well as a negative electrode plate, an electrolyte, and a separator. During a charge/discharge process of the battery, active ions are intercalated and de-intercalated back and forth between a positive electrode plate and a negative electrode plate. The electrolyte serves to conduct ions between the positive electrode plate and the negative electrode plate. The separator is arranged between the positive electrode plate and the negative electrode plate, and mainly functions to prevent the positive and negative electrodes from short-circuiting and enables ions to pass through. The negative electrode plate, the electrolyte, and the separator are described in detail below.

[Negative Electrode Plate]

The negative electrode plate comprises a negative current collector and a negative film layer disposed on at least one surface of the negative current collector, the negative film layer comprising a negative active material described above in the present application.

As an example, the negative current collector has two surfaces opposite one another in its own thickness direction, and the negative film layer is provided on either or both of the two opposite surfaces of the negative current collector.

In some embodiments, the negative current collector can be a metal foil or a composite current collector. For example, as a metal foil, a copper foil can be used. The composite current collector may comprise a polymer material substrate and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative active material can be a negative active material known in the art for batteries. As an example, the negative active material may include at least one of the following materials: artificial graphite, natural graphite, soft carbon, hard carbon, a silicon-based material, a tin-based material and lithium titanate, etc. The silicon-based material may be selected from at least one of elemental silicon, silicon oxides, silicon carbon composites, silicon nitrogen composites and silicon alloys. The tin-based material may be selected from at least one of elemental tin, tin oxides, and tin alloys. However, the present application is not limited to those materials, and other conventional materials that can be used as negative active materials for batteries may also be used. These negative active materials may be used alone or in combination of two or more.

In some embodiments, the negative film layer may optionally comprise a binder. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative film layer may optionally comprise a conductive agent. The conductive agent may be selected from at least one of superconductive carbon, acetylene black, carbon black, ketjenblack, carbon dots, carbon nanotubes, graphene, and carbon nanofibers.

In some embodiments, the negative film layer may optionally comprise other auxiliary agents, such as thickener (e.g. sodium carboxymethyl cellulose (CMC-Na)) and the like.

In some embodiments, the negative electrode plate can be prepared as follows: dispersing the above-mentioned components for preparing the negative electrode plate, such as a negative active material, a conductive agent, a binder and any other components, in a solvent (e.g. deionized water) to form a negative electrode slurry; and coating a negative current collector with the negative electrode slurry, followed by procedures such as drying and cold pressing, so as to obtain the negative electrode plate.

[Electrolyte]

The electrolyte serves to conduct ions between the positive electrode plate and the negative electrode plate. The type of the electrolyte is not specifically limited in the present application, and can be selected according to actual requirements. For example, the electrolyte may be in a liquid state, a gel state or an all-solid state.

In some implementations, the electrolyte is an electrolyte solution. The electrolyte solution includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolytic solution may optionally include an additive. For example, the additive may include a negative electrode film-forming additive and a positive electrode film-forming additive, and may further include an additive that can improve certain performances of the battery, such as an additive that improves the overcharge performance of the battery, or an additive that improves the high temperature or low-temperature performance of the battery.

[Separator]

In some embodiments, the secondary battery further includes a separator. The type of the separator is not particularly limited in the present application, and any well known porous-structure separator with good chemical stability and mechanical stability may be selected.

In some embodiments, the material of the separator may be selected from at least one of glass fibers, non-woven fabrics, polyethylene, polypropylene and polyvinylidene fluoride. The separator may be either a single-layer film or a multi-layer composite film, and is not limited particularly. When the separator is a multi-layer composite film, the materials in the respective layers may be same or different, which is not limited particularly.

In some embodiments, the positive electrode plate, the negative electrode plate and the separator can be made into the electrode assembly by a winding process or a lamination process.

In some embodiments, the secondary battery may comprise an outer package. The outer package can be used to encapsulate the above-mentioned electrode assembly and electrolyte.

In some implementations, the outer package of the secondary battery may be a hard shell, such as a hard plastic shell, an aluminum shell, or a steel shell. The outer package of the secondary battery may also be a soft bag, such as a pouch-type soft bag. The material of the soft bag may be plastics, and the examples of plastics may include polypropylene, polybutylene terephthalate, polybutylene succinate, etc.

Figure 6:
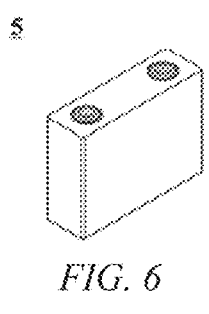
FIG. 6 is a schematic diagram of a secondary battery according to an embodiment of the present application.

The shape of the secondary battery is not particularly limited in the present application, and may be cylindrical, square or any other shape. For example, FIG. 6 illustrates the secondary battery 5 having a square structure as an example.

Figure 7:
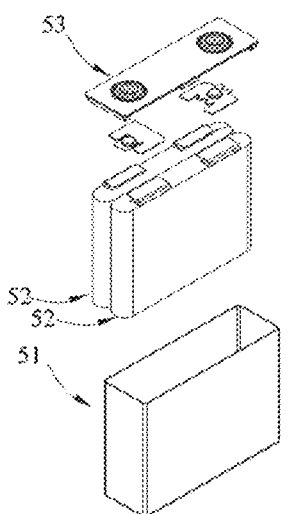
FIG. 7 is an exploded view of the secondary battery according to an embodiment of the present application shown in FIG. 6.

In some embodiments, referring to FIG. 7, the outer package may include a housing 51 and a cover plate 53. Herein, the housing 51 may include a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. A positive electrode plate, a negative electrode plate and a separator can be subjected to a winding process or a stacking process to form an electrode assembly 52. The electrode assembly 52 is encapsulated in the accommodating cavity. The electrolyte is infiltrated into the electrode assembly 52. The number of the electrode assemblies 52 contained in the secondary battery 5 may be one or more, and can be selected by those skilled in the art according to actual requirements.

Battery Module

In some embodiments, the secondary battery can be assembled into a battery module, and the number of the secondary batteries contained in the battery module may be one or more, and the specific number can be selected by those skilled in the art according to the application and capacity of the battery module.

Figure 8:
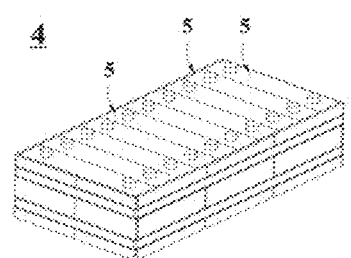
FIG. 8 is a schematic diagram of a battery module according to an embodiment of the present application.

FIG. 8 shows a battery module 4 as an example. Referring to FIG. 8, in the battery module 4, a plurality of secondary batteries 5 may be arranged in sequence in the length direction of the battery module 4. Of course, the secondary batteries may also be arranged in any other manner. Furthermore, the plurality of secondary batteries 5 may be fixed by fasteners.

Optionally, the battery module 4 may further comprise a housing with an accommodating space in which and the plurality of secondary batteries 5 are accommodated.

Battery Pack

In some embodiments, the above battery module may also be assembled into a battery pack, the number of the battery modules contained in the battery pack may be one or more, and the specific number can be selected by those skilled in the art according to the application and capacity of the battery pack.

Figure 9:
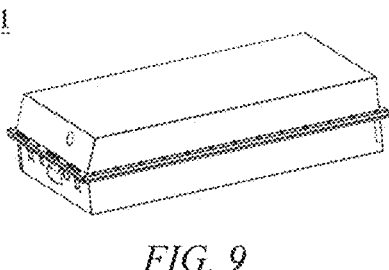
FIG. 9 is a schematic diagram of a battery pack according to an embodiment of the present application.
Figure 10:
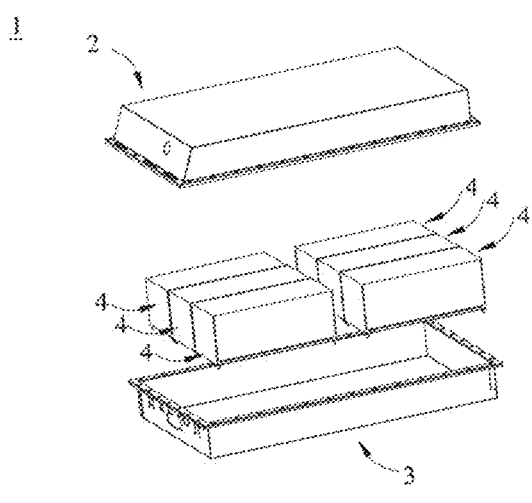
FIG. 10 is an exploded view of the battery pack according to the embodiment of the present application as shown in FIG. 9.

FIG. 9 and FIG. 10 show a battery pack 1 as an example. Referring to FIG. 9 and FIG. 10, the battery pack 1 may comprise a battery case and a plurality of battery modules 4 provided in the battery case. The battery case comprises an upper case 2 and a lower case 3, wherein the upper case 2 can cover the lower case 3 to form a closed space for accommodating the battery modules 4. The plurality of battery modules 4 may be arranged inside the battery case in any manner.

Power Consuming Device

In addition, the present application further provides a power consuming device. The power consuming device includes at least one of the secondary battery, battery module, or battery pack provided by the present application. The secondary battery, battery module or battery pack can be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but is not limited thereto.

As for the power consuming device, the secondary battery, battery module or battery pack can be selected according to the usage requirements thereof.

Figure 11:
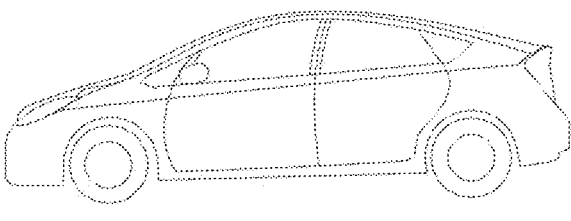
FIG. 11 is a schematic diagram of a power consuming device using a secondary battery according to an embodiment of the present application as a power source.

FIG. 11 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

As another example, the power consuming device may be a mobile phone, a tablet computer, a laptop computer, etc. It is generally required that the power consuming device is thin and light, and the secondary battery may be used as a power source.

EXAMPLES

Hereinafter, the examples of the present application will be explained. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

Example 1

1) Preparation of First Positive Electrode Slurry

A first positive active material (D50: 8 μm) as shown in Table 1, a conductive agent SP and a polyvinylidene fluoride (PVDF) as a binder are fully stirred and mixed in a N-methylpyrrolidone (NMP) solvent at a weight ratio of 97:2:1, and a viscosity is tested to be in the range of 3000-10000 mPa·s suitable for coating at a rotational speed of 12 rpm, to prepare a first positive electrode slurry.

2) Preparation of Second Positive Electrode Slurry

A second positive active material (D50: 8 μm), a conductive agent SP and a polyvinylidene fluoride (PVDF) as a binder are fully stirred and mixed in a N-methylpyrrolidone (NMP) solvent at a weight ratio of 97:2:1, and a viscosity is tested to be in the range of 3000-10000 mPa·s suitable for coating at a rotational speed of 12 rpm, to prepare a second positive electrode slurry.

3) Preparation of Positive Electrode Plate

A first positive electrode slurry is coated on one surface of an aluminum foil as a positive current collector, and a second positive electrode slurry is simultaneously coated on the first positive electrode slurry by a dual-chamber coating apparatus, and the two coating steps are performed synchronously and completed synchronously, thereby forming a first positive film layer and a second positive film layer, wherein the first positive film layer has a weight of 125 g/cm² and the second positive film layer has a weight of 125 g/cm². After the coating is completed, the solvent NMP is dried by a coater oven, and then followed by cold pressing, slitting and die cutting procedures, so as to obtain a positive electrode plate.

4) Preparation of Negative Electrode Plate 95 wt % of a negative active material (artificial graphite), 1.0 wt % of a conductive agent (conductive carbon black), 2.0 wt % of a binder (styrene-butadiene rubber (SBR)), and 2.0 wt % of a thicker (sodium carboxymethyl cellulose (CMC)) are mixed, stirred with deionized water, and are dispersed to prepare a negative electrode slurry. Then, the negative electrode slurry is coated on a copper foil which, after both sides of the copper foil are coated, is subjected to drying, cold pressing, slitting, and plate-making procedures, to prepare a negative electrode plate.

5) Preparation of Battery

The prepared positive electrode plate, the separator, and the negative electrode plate are stacked in sequence so that the separator is positioned between the positive electrode plate and the negative electrode plate for separation, and are wound to obtain a bare battery cell. Subsequently, welding and packaging are performed, and the electrolyte is filled before procedures such as formation, degassing, and final sealing to finally obtain a secondary battery.

Examples 2-26

In examples 2-26, the same preparation method as in example 1 is used, except that the following changes are made respectively as shown in Table 1: the volume median particle size (D50) of the hollow particles of the first positive active material, the volume median particle size (D50) of the solid particles of the second positive active material, "the ratio of D50 of the hollow particles to the D50 of the solid particles", "the ratio of the number of the hollow particles to the number of all particles", "the ratio of the hollow diameter of the hollow particles to the D50 of the hollow particles", "the BET of the first positive active material", "the BET of the second positive active material", "the weight ratio of the first positive film layer to the second positive film layer", "the thicknesses of the first positive film layer and the second positive film layer", and "the thickness ratio of the first positive film layer to the second positive film layer".

Comparative Example 1

In comparative example 1, the same preparation method as in example 1 is used, except that as shown in Table 1, only the first positive active material is used to form the first positive film layer, without the second positive film layer.

Comparative Example 2

In comparative example 2, the same preparation method as in example 1 is used, except that as shown in Table 1, only the second positive active material is used to form the second positive film layer, without the first positive film layer.

Comparative Example 3

In comparative example 3, the same preparation method as in example 1 is used, except that during the preparation process, the positions of the first positive film layer and the second positive film layer are reversed, that is, the second positive film layer is formed on the aluminum foil (close to the current collector at the bottom), and the first positive film layer is formed on the second positive film layer (close to the separator at the top).

Hereinafter, the test procedures for related parameters of the foregoing examples 1-26 and comparative examples 1-3 of the present application will be described in detail.

I. Volume Median Particle Size (D50) Test

A laser particle size analyzer of Model Malvern 3000 (MasterSizer 3000) is used, with reference to the standard process: GB/T19077-2016/ISO 13320:2009, and the specific test process includes: taking an appropriate amount of the test sample (the sample having a concentration that can ensure a shading of 8%-12%), adding 20 ml of deionized water and externally applying an ultrasonic treatment (53 KHz/120 W) for 5 min at the same time to ensure that the sample is completely dispersed, and then performing tests on the first positive active material and the second positive active material of examples 1-26 and comparative examples 1-3 according to the Standard GB/T19077-2016/ISO 13320: 2009. The test results are shown in Table 1.

II. Median Diameter Test

The hollow diameter of the hollow particles is determined by a cross-sectional morphology electron microscope image, specifically by: selecting a coated plate sample for capturing an image of its cross-sectional topography, then randomly selecting a certain region, and calculating the hollow diameter of all hollow particles in the field of view, wherein the longest diameter is taken as a reference when the hollow diameter is measured. The hollow diameter is obtained by averaging the diameters of all hollow particles.

III. Morphology Test

The positive electrode plates of examples 1-26 and comparative examples 1-3 each are tested with a ZEISS sigma 300 scanning electron microscope, and then tested with reference to the Standard JY/T010-1996 to observe the sample morphology. The observations are specifically as follows.

Figure 2A:
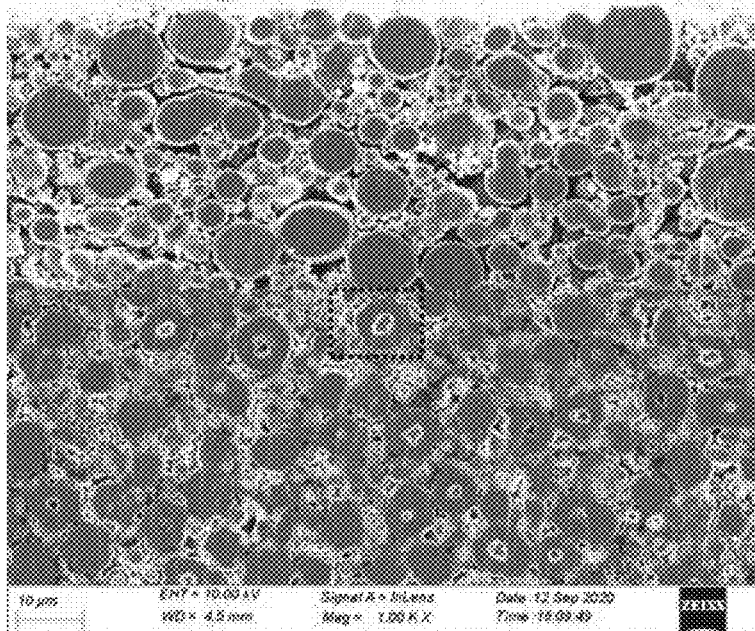
FIG. 2a shows an SEM image of a positive electrode plate according to another embodiment of the present application.
Figure 2B:

As shown in FIG. 2a, by observing the sample morphology of the positive electrode plate according to example 1 of the present application, it can be confirmed that the positive electrode plate according the present application is formed with a double-layer film layer, in which the first positive film layer is formed at the bottom layer close to the current collector, mainly composed of hollow particles; and the second positive film layer is formed above the first positive film layer close to the separator, mainly composed of solid particles. As shown in FIG. 2b, the first positive film layer contains hollow particles in a nearly spherical shape, and the BET of the first positive film layer material is increased by the hollow structure.

The sample morphologies of the positive electrode plates according to example 2-26 of the present application are observed in the same manner, and it is observed that the positive electrode plate according to the present application is formed with a double-layer film layer, in which the first positive film layer is formed at the bottom layer close to the current collector, mainly composed of hollow particles; and the second positive film layer is formed above the first positive film layer close to the separator, mainly composed of solid particles.

Figure 3:
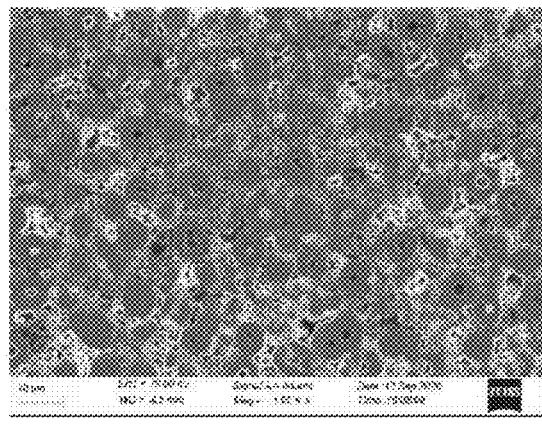
FIG. 3 shows an SEM image of a positive electrode plate according to comparative example 1 of the present application.

As shown in FIG. 3, by observing the sample morphology of the positive electrode plate of comparative example 1 of the present application, it is confirmed that the positive electrode plate of comparative example 1 is formed with only a single film layer, that is, only the first positive film layer mainly composed of hollow particles is formed at the bottom layer close to the current collector, and no second positive film layer composed of solid particles is provided.

Figure 4:
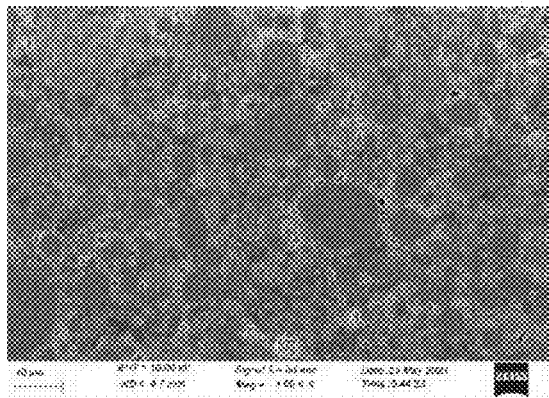
FIG. 4 shows an SEM image of a positive electrode plate according to comparative example 2 of the present application.

As shown in FIG. 4, by observing the sample morphology of the positive electrode plate of comparative example 2 of the present application, it is confirmed that the positive electrode plate of comparative example 2 is formed with only a single film layer, that is, only the second positive film layer mainly composed of solid particles is formed at the top layer close to the separator, and no first positive film layer composed of hollow particles is provided.

Figure 5:
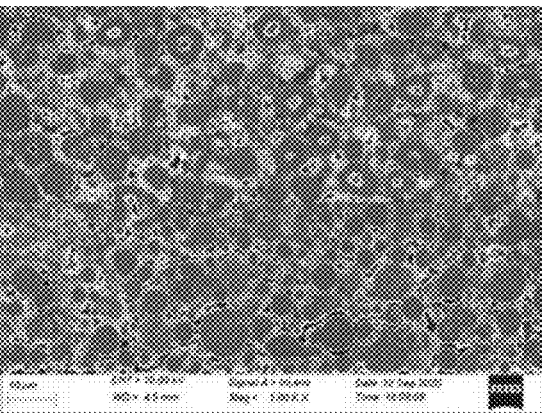
FIG. 5 shows an SEM image of a positive electrode plate according to comparative example 3 of the present application.

As shown in FIG. 5, by observing the sample morphology of the positive electrode plate of comparative example 3 of the present application, it is confirmed that although the positive electrode plate of comparative example 3 is also formed with a double-layer film layer, the second positive film layer mainly composed of solid particles is formed at the bottom layer close to the current collector, and the first positive film layer mainly composed of hollow particles is formed above the second positive film layer close to the separator, that is, the double-layer film layer is arranged completely opposite to that of the present application.

IV. Specific Surface Area (BET) Test

The BETs of the first positive active material and the second positive active material of examples 1-26 and comparative examples 1-3 are tested with a Gemini VII 2390 multi-station automatic specific surface area and porosity analyzer (Micromeritics, U.S.A.). About 7 g of sample is placed in a 9 cc long tube with bulbs, degassed at 150° C. for 15 minutes, and then placed in the analyzer for testing to obtain BET data. The test results are shown in Table 1.

V. Battery Performance Test

The following battery performance tests are performed on the positive electrode plates obtained in examples 1~26 and comparative examples 1~3. The test results are shown in Table 2.

(1) Discharge Rate Test

The battery cell stands at 25° C. for 30 min, is discharged to 3.0 V at a constant current of 0.33 C, stands at 25° C. for 1 hour, is charged to 4.3 V at a constant current of 0.33 C, is charged at a constant voltage to a cut-off current of 0.05 C, stands at 25° C. for 30 min, is discharged to 3.0 V at a constant current of 0.33 C, and then an initial capacity C0 is obtained. Subsequently, the battery cell stands at 25° C. for 1 hour, is charged to 4.3 V at a constant current of 0.33 C, is charged at a constant voltage to a cut-off current of 0.05 C, stands at 25° C. for 30 min, is discharged at 1 C to 3.0 V, and then a capacity C1 at 1 C is obtained. Subsequently, the battery cell stands at 25° C. for 1 hour, is charged to 4.3 V at a constant current of 0.33 C, is charged at a constant voltage to a cut-off current of 0.05 C, stands at 25° C. for 30 min, is discharged at 2 C to 3.0 V, and then a capacity C2 at 2 C is obtained. The capacity retention at 1 C is C1/C0, and the capacity retention at 2 C is C2/C0.

(2) Capacity Test

The battery cell stands at 25° C. for 30 min, is discharged to 3.0 V at a constant current of 0.33 C, stands at 25° C. for 30 min, is charged to 4.3 V at a constant current of 0.33 C, is charged at a constant voltage to a cut-off current of 0.05 C, stands at 25° C. for 30 min, is discharged to 3.0 V at a constant current of 0.33 C, and then a battery cell capacity C is obtained.

(3) Direct-Current Resistance (DCR) Test

First, the capacity C0 is obtained by constant capacitance of the battery cell according to the capacity test described in the above (2). The battery cell stands at 25° C. for 30 min, is charged to 4.3 V at a constant current of 0.33 C0, is charged at a constant voltage to a cut-off current of 0.05 C0, stands at 25° C. for 5 min, is discharged to 0.5 C0 at 0.33 C0. At this time, the battery cell has 50% SOC. Then, the battery cell is discharged at a rate of 2 C0 for 30 seconds. The voltage of the battery cell before discharging at 2 C0 is V1, and the voltage after discharging for 30 seconds is V2. The calculation formula for DCR is as follows:

$$R=(V1-V2)/2C0$$

TABLE 1

| Experiment items | First positive active material (the formed first positive film layer is disposed on the positive current collector) | | | | | Second positive active material (the formed second positive film layer is disposed on the first positive film layer) | | Relation- ship between the hollow particles and the solid particles Ratio of D50 of the hollow particles to D50 of the solid particles | Relationship between the first positive film layer and the second positive film layer | |
| --- | --- | --- | --- | --- | --- | --- | --- | --- | --- | --- |
| | Ratio of the number of the hollow particles to the number of all particles | Hollow diameter (µm) | Volume median particle size (D50, µm) | Ratio of hollow diameter to D50 | Specific surface area (BET, m²/g) | Volume median particle size (D50, µm) | Specific surface area (BET, m²/g) | | Weight ratio | Thick- ness ratio |
| Example 1 | 70% | 0.8 | 8 | 0.1 | 1 | 8 | 0.1 | 1 | 1:1 | 1 |
| Example 2 | 70% | 1 | 10 | 0.1 | 1 | 10 | 0.1 | 1 | 1:1 | 1 |

TABLE 1-continued

| Experiment items | First positive active material (the formed first positive film layer is disposed on the positive current collector) | | | | | Second positive active material (the formed second positive film layer is disposed on the first positive film layer) | | Relationship between the hollow particles and the solid particles | Relationship between the first positive film layer and the second positive film layer | |
|---|---|---|---|---|---|---|---|---|---|---|
| | Ratio of the number of the hollow particles to the number of all particles | Hollow diameter (μm) | Volume median particle size (D50, μm) | Ratio of hollow diameter to D50 | Specific surface area (BET, m²/g) | Volume median particle size (D50, μm) | Specific surface area (BET, m²/g) | Ratio of D50 of the hollow particles to D50 of the solid particles | Weight ratio | Thickness ratio |
| Example 3 | 70% | 0.5 | 5 | 0.1 | 1 | 5 | 0.1 | 1 | 1:1 | 1 |
| Example 4 | 70% | 0.08 | 0.8 | 0.1 | 1 | 0.8 | 0.1 | 1 | 1:1 | 1 |
| Example 5 | 70% | 0.1 | 1 | 0.1 | 1 | 1 | 0.1 | 1 | 1:1 | 1 |
| Example 6 | 70% | 1.5 | 15 | 0.1 | 1 | 15 | 0.1 | 1 | 1:1 | 1 |
| Example 7 | 70% | 1.6 | 16 | 0.1 | 1 | 16 | 0.1 | 1 | 1:1 | 1 |
| Example 8 | 70% | 0.3 | 3 | 0.1 | 1 | 3 | 0.1 | 1 | 1 :1 | 1 |
| Example 9 | 70% | 0.9 | 9 | 0.1 | 1 | 9 | 0.1 | 1 | 1:1 | 1 |
| Example 10 | 70% | 1 | 4.5 | 0.1 | 1 | 9 | 0.1 | 0.5 | 1:1 | 1 |
| Example 11 | 70% | 1 | 9 | 0.1 | 1 | 4.5 | 0.1 | 2 | 1:1 | 1 |
| Example 12 | 60% | 1 | 10 | 0.1 | 1 | 10 | 0.1 | 1 | 1:1 | 1 |
| Example 13 | 80% | 1 | 10 | 0.1 | 1 | 10 | 0.1 | 1 | 1:1 | 1 |
| Example 14 | 100% | 1 | 10 | 0.1 | 1 | 10 | 0.1 | 1 | 1:1 | 1 |
| Example 15 | 70% | 0.6 | 10 | 0.06 | 1 | 10 | 0.1 | 1 | 1:1 | 1 |
| Example 16 | 70% | 5 | 10 | 0.5 | 1 | 10 | 0.1 | 1 | 1:1 | 1 |
| Example 17 | 70% | 6 | 10 | 0.6 | 1 | 10 | 0.1 | 1 | 1:1 | 1 |
| Example 18 | 70% | 1 | 10 | 0.1 | 3 | 10 | 0.1 | 1 | 1:1 | 1 |
| Example 19 | 70% | 1 | 10 | 0.1 | 1 | 10 | 0.1 | 1 | 1:10 | 0.1 |
| Example 20 | 70% | 1 | 10 | 0.1 | 1 | 10 | 0.1 | 1 | 1:9 | 0.5 |
| Example 21 | 70% | 1 | 10 | 0.1 | 1 | 10 | 0.1 | 1 | 9:1 | 2 |
| Example 22 | 70% | 1 | 10 | 0.1 | 1 | 10 | 0.1 | 1 | 10:1 | 10 |
| Example 23 | 70% | 1 | 10 | 0.1 | 1 | 10 | 0.1 | 1 | 1:3 | 0.3 |
| Example 24 | 70% | 1 | 10 | 0.1 | 1 | 10 | 0.1 | 1 | 1:2 | 0.5 |
| Example 25 | 70% | 1 | 10 | 0.1 | 1 | 10 | 0.1 | 1 | 2:1 | 2 |
| Example 26 | 70% | 1 | 1 0 | 0.1 | 1 | 10 | 0.1 | 1 | 2.5:1 | 2.5 |
| Comparative example 1 | 70% | 0.8 | 8 | 0.1 | 1 | — | — | 1 | — | — |
| Comparative example 2 | — | — | — | — | — | 8 | 0.1 | 1 | — | — |

TABLE 1-continued

| Experiment items | First positive active material (the formed first positive film layer is disposed on the positive current collector) Ratio of the number of the hollow particles to the number of all particles | Hollow diameter (μm) | Volume median particle size (D50) (μm) | Ratio of hollow diameter to D50 | Specific surface area (BET, m²/g) | Second positive active material (the formed second positive film layer is disposed on the first positive film layer) Volume median particle size (D50, μm) | Specific surface area (BET, m²/g) | Relationship between the hollow particles and the solid particles Ratio of D50 of the hollow particles to D50 of the solid particles | Relationship between the first positive film layer and the second positive film layer Weight ratio | Thickness ratio |
|---|---|---|---|---|---|---|---|---|---|---|
| Comparative example 3 | 70% | 0.8 | 8 | 0.1 | 1 | 8 | 0.1 | 1 | 1:1 | 1 |

TABLE 2

| Test items | 25° C.-1 C discharge rate/% | 25° C.-2 C discharge rate/% | 25° C.-DCR/ mΩ@50% SOC | Capacity/mAh |
|---|---|---|---|---|
| Example 1 | 94.93 | 83.85 | 15.58 | 4.62 |
| Example 2 | 94.55 | 82.14 | 16.77 | 4.54 |
| Example 3 | 95.34 | 83.73 | 15.42 | 4.71 |
| Example 4 | 96.25 | 85.08 | 15.21 | 4.76 |
| Example 5 | 96.14 | 84.22 | 14.84 | 4.78 |
| Example 6 | 93.81 | 81.23 | 16.89 | 4.43 |
| Example 7 | 93.12 | 80.89 | 17.05 | 4.35 |
| Example 8 | 95.43 | 83.989 | 15.03 | 4.75 |
| Example 9 | 94.61 | 82.83 | 16.25 | 4.58 |
| Example 10 | 95.01 | 83.39 | 15.87 | 4.62 |
| Example 11 | 94.78 | 83.02 | 16.19 | 4.6 |
| Example 12 | 93.02 | 79.89 | 18.58 | 4.58 |
| Example 13 | 93.78 | 81.33 | 16.42 | 4.51 |
| Example 14 | 94.71 | 82.39 | 16.21 | 4.48 |
| Example 15 | 94.62 | 82.16 | 16.27 | 4.5 |
| Example 16 | 94.72 | 82.54 | 16.12 | 4.52 |
| Example 17 | 94.82 | 82.76 | 16.04 | 4.5 |
| Example 18 | 95.12 | 83.31 | 16.03 | 4.56 |
| Example 19 | 86.55 | 76.43 | 22.67 | 5.08 |
| Example 20 | 87.29 | 77.01 | 21.49 | 5.04 |
| Example 21 | 97.54 | 85.27 | 14.73 | 4.21 |
| Example 22 | 97.65 | 85.36 | 14.55 | 4.17 |
| Example 23 | 90.78 | 79.82 | 20.78 | 4.93 |
| Example 24 | 91.55 | 80.39 | 20.06 | 4.81 |
| Example 25 | 92.02 | 81.13 | 17.68 | 4.73 |
| Example 26 | 92.52 | 81.37 | 17.56 | 4.67 |
| Comparative example 1 | 97.79 | 86.05 | 14.3 | 4.03 |
| Comparative example 2 | 86.18 | 74.62 | 22.23 | 5.15 |
| Comparative example 3 | 90.29 | 79.34 | 21.17 | 4.59 |

As can be seen from Table 1 and Table 2,

Compared with comparative examples 1-3, in examples 1-26, a positive electrode plate having a double-layer electrode film layer formed of a first positive film layer composed of a hollow material and a second positive film layer composed of a solid material as described in the present application, the overall rate performance of the lithium ion battery is better, and DCR is lower, while the capacity of the battery is higher. Therefore, a lithium ion battery manufactured by using the positive electrode plate of the present invention has good dynamics performance, and provides a solution for application of a thick electrode plate in a battery.

It should be noted that the present application is not limited to the above embodiments. The above embodiments are exemplary only, and any embodiment that has substantially same constitutions as the technical ideas and has the same effects within the scope of the technical solutions of the present application falls within the technical scope of the present application. Furthermore, various modifications to the embodiments that can be conceived by those skilled in the art, and other implementations constructed by combining some of the constituent elements of the embodiments also fall within the scope of the present application without departing from the spirit of the present application.

The invention claimed is:

1. A positive electrode plate, comprising
a positive current collector and a positive film layer comprising a first positive film layer and a second positive film layer, wherein,
the first positive film layer is disposed on at least one surface of the positive current collector and comprises a first positive active material comprising a hollow particle material, the hollow particle materials comprising a plurality of hollow particles; and
the second positive film layer is disposed on the first positive film layer and comprises a second positive active material comprising a solid particle material, the solid particle material comprising a plurality of solid particles, each solid particle having a solid core,
the first positive film layer has a thickness of 100-200 μm,
the second positive film layer has a thickness of 100-200 μm.

2. The positive electrode plate according to claim 1, wherein
in the first positive active material, a number of the hollow particles accounts for 70% or more of a number of all particles of the first positive active material.

3. The positive electrode plate according to claim 1, wherein
the hollow particles each have a volume median particle size of 1-15 μm; and/or
the solid particles each have a volume median particle size of 1-15 μm.

4. The positive electrode plate according to claim 3, wherein the hollow particles each have a volume median particle size of 3-9 μm.

5. The positive electrode plate according to claim 3, wherein the solid particles each have a volume median particle size of 3-9 μm.

6. The positive electrode plate according to claim 1, wherein,
a ratio of the volume median particle size of the hollow particle to the volume median particle size of the solid particle is between 0.5-2.

7. The positive electrode plate according to claim 1, wherein,
a ratio of a hollow diameter of the hollow particle to the volume median particle size of the hollow particle is between 0.1-0.5.

8. The positive electrode plate according to claim 1, wherein,
the hollow particle material has a BET of 1-3 m²/g and the solid particle material has a BET of 0.1-1 m²/g.

9. The positive electrode plate according to claim 1, wherein,
a weight ratio of the first positive film layer to the second positive film layer is between 1:9-9:1.

10. The positive electrode plate according to claim 1, wherein,
a thickness ratio of the first positive film layer to the second positive film layer is between 0.5-2.

11. A secondary battery, wherein
the secondary battery comprises the positive electrode plate according to claim 1.

12. A battery module, wherein
the battery module comprises the secondary battery according to claim 11.

13. A battery pack, wherein
the battery pack comprises the battery module according to claim 12.

14. A power consuming device, wherein
the power consuming device comprises the secondary battery according to claim 11.

15. The positive electrode plate according to claim 1, wherein,
a hollow diameter of the hollow particles is 0.06 to 0.6 μm.

16. The positive electrode plate according to claim 1, wherein,
a weight ratio of the first positive film layer to the second positive film layer is between 1:2-2:1.

17. The positive electrode plate according to claim 1, wherein,
a weight ratio of the first positive film layer to the second positive film layer is 1.

18. The positive electrode plate according to claim 1, wherein,
a thickness ratio of the first positive film layer to the second positive film layer is 1.

19. The positive electrode plate according to claim 1, wherein,
the hollow particle material and the solid particle material are each composed of one selected from a lithium-containing phosphate having an olivine structure and a lithium transition metal oxide.

* * * * *